(12) United States Patent
Han et al.

(10) Patent No.: US 7,902,710 B2
(45) Date of Patent: Mar. 8, 2011

(54) ELECTRIC MACHINE

(75) Inventors: Seok-Hee Han, Dunlap, IL (US);
Mustafa Kamil Guven, Dunlap, IL (US); Thomas Merlin Jahns, Madison, WI (US)

(73) Assignees: Caterpillar Inc., Peoria, IL (US); University of Wisconsin, Madison, WI (US)

( * ) Notice: Subject to any disclaimer, the term of this patent is extended or adjusted under 35 U.S.C. 154(b) by 0 days.

(21) Appl. No.: 12/285,311

(22) Filed: Oct. 1, 2008

(65) Prior Publication Data

US 2010/0079026 A1    Apr. 1, 2010

(51) Int. Cl.
*H02K 21/12* (2006.01)

(52) U.S. Cl. .......... 310/156.53; 310/156.36; 310/156.39; 310/156.45; 310/156.48; 310/156.56

(58) Field of Classification Search . 310/156.36–156.56
See application file for complete search history.

(56) References Cited

U.S. PATENT DOCUMENTS

| | | | |
|---|---|---|---|
| 6,177,745 B1 * | 1/2001 | Narita et al. | 310/156.43 |
| 6,239,525 B1 | 5/2001 | Matsunobu et al. | |
| 6,674,205 B2 | 1/2004 | Biais et al. | |
| 6,684,483 B2 | 2/2004 | Rahman et al. | |
| 6,741,003 B2 | 5/2004 | Naito et al. | |
| 6,815,859 B2 | 11/2004 | Sakuma et al. | |
| 7,019,426 B2 | 3/2006 | Mori et al. | |
| 7,057,322 B2 * | 6/2006 | Araki et al. | 310/156.53 |
| 7,151,335 B2 * | 12/2006 | Tajima et al. | 310/156.48 |
| 7,233,089 B2 | 6/2007 | Matsunobu et al. | |
| 7,321,177 B2 | 1/2008 | Uchida et al. | |
| 7,358,638 B2 | 4/2008 | Miyashita et al. | |
| 7,504,754 B2 * | 3/2009 | Jahns et al. | 310/156.53 |
| 2003/0102755 A1 * | 6/2003 | Naito et al. | 310/156.39 |
| 2004/0095034 A1 * | 5/2004 | Popov | 310/156.56 |
| 2005/0140236 A1 | 6/2005 | Jeong et al. | |
| 2006/0181173 A1 | 8/2006 | Takahashi et al. | |
| 2006/0250041 A1 | 11/2006 | Adaniya et al. | |
| 2006/0290221 A1 | 12/2006 | Hsu | |

(Continued)

FOREIGN PATENT DOCUMENTS

JP    2003-199273 A    7/2003

(Continued)

OTHER PUBLICATIONS

Korean Intellectual Property Office, PCT International Search Report mailed May 14, 2010 for international application No. PCT/US2009058956.

(Continued)

*Primary Examiner* — Quyen Leung
*Assistant Examiner* — Jose A Gonzales Quinones

(57) ABSTRACT

An electric machine includes a rotor having at least one pole pair, the at least one pole pair including a first magnetic pole and a second magnetic pole having opposite polarities. The first magnetic pole may include a first inner radial permanent-magnet layer and a first outer radial permanent-magnet layer. The second magnetic pole may include a second inner radial permanent-magnet layer and a second outer radial permanent-magnet layer. An outer end of the first inner radial permanent-magnet layer and an outer end of the second inner radial permanent-magnet layer may be separated by an angle of between about 27 and about 55 electrical degrees. The electric machine may also include a stator having a stator core with an odd number of stator slots per pole pair of the rotor.

18 Claims, 2 Drawing Sheets

U.S. PATENT DOCUMENTS

| | | | |
|---|---|---|---|
| 2007/0096577 A1 | 5/2007 | Guven et al. | |
| 2007/0096578 A1 | 5/2007 | Jahns et al. | |
| 2007/0096579 A1 | 5/2007 | Aydin et al. | |
| 2007/0145850 A1* | 6/2007 | Hsu | 310/156.56 |
| 2008/0024027 A1 | 1/2008 | Aydin et al. | |
| 2008/0024035 A1 | 1/2008 | Aydin et al. | |

FOREIGN PATENT DOCUMENTS

| | | |
|---|---|---|
| JP | 2003199273 | 7/2003 |
| JP | 2008-017672 A | 1/2008 |
| JP | 2008017672 | 1/2008 |
| JP | 2008-167520 A | 7/2008 |
| JP | 2008167520 | 7/2008 |

OTHER PUBLICATIONS

Seok-Hee Han et al., Reduction of Core Losses and Torque Ripple in Interior Permanent Magnet Synchronous Machines, May 20, 2008, pp. 1-27.

Seok-Hee Han et al., Reduction of Core Losses and Torque Ripple in Interior Permanent Magnet Synchronous Machines—Part A, May 20, 2008.

Seok-Hee Han et al., Reduction of Core Losses and Torque Ripple in Interior Permanent Magnet Synchronous Machines—Part B, May 20, 2008.

Nicola Bianchi et al., Design Techniques for Reducing the Cogging Torque in Surface-Mounted PM Motors, IEEE Transactions on Industry Applications, Sep./Oct. 2002, pp. 1259-1265, vol. 38, No. 5, IEEE.

Nicola Bianchi et al., Rotor flux-barrier design for torque ripple reduction in synchronous reluctance motors, 2006, pp. 1193-1200, IEEE.

J.S. Hsu et al., Report on Toyota/Prius Motor Design and Manufacturing Assessment, Jul. 2004, pp. 1-14, Oak Ridge National Laboratory.

Wen L. Soong et al., Field-Weakening Performance of Interior Permanent-Magnet Motors, IEEE Transactions on Industry Applications, Sep./Oct. 2002, pp. 1251-1258, vol. 38, No. 5, IEEE.

T.A. Burress et al., Evaluation of the 2007 Toyota Camry Hybrid Synergy Drive System, Jan. 2008, pp. 1-92, Oak Ridge National Laboratory.

Seok-Hee Han et al., Torque Ripple Reduction in Interior Permanent Magnet Synchronous Machines Using the Principle of Mutual Harmonics Exclusion, 2007, pp. 558-565, IEEE.

Yukio Honda et al., Motor Design Considerations and Test Results of an Interior Permanent Magnet Synchronous Motor for Electric Vehicles, Oct. 5-9, 1997, pp. 75-82, IEEE.

Munehiro Kamiya, Development of Traction Drive Motors for the Toyota Hybrid System, 2006, pp. 15 and 473-479, vol. 126, No. 4, IEEJ.

* cited by examiner

ELECTRIC MACHINE

TECHNICAL FIELD

The present disclosure relates to electric machines having a rotor and a stator and, more particularly, to electric machines having a rotor that includes permanent magnets.

BACKGROUND

Many electric machines, such as electric motors and electric generators, include a stator that is held stationary and a rotor that rotates adjacent the stator. The stator and rotor may be configured to transfer power between one another through one or more magnetic fields. Some electric machines may include an interior permanent-magnet-type rotor with permanent magnets mounted inside a rotor core of the rotor for generating a magnetic field of the rotor. Such a rotor may have the permanent magnets arranged in a manner such that they form north and south magnetic poles of the rotor in alternating positions around the circumference of the rotor. For example, at each of multiple equal angular intervals, the rotor may include a single magnet that forms either a north or south magnetic pole of the rotor. Such a rotor may have no magnets disposed between the ends of the magnets forming adjacent north and south magnetic poles.

Thus, the intensity of the magnetic field generated by the rotor may vary as a function of the position around the circumference of the rotor. At those circumferential positions occupied by a magnet forming a north or south magnetic pole of the rotor, the magnetic field may have an intensity substantially equal to that generated by the magnet. At the end of each magnet providing a magnetic pole of the rotor, the intensity of the magnetic field of the rotor may drop in a substantially stepped manner, with the magnetic field having very low intensity at circumferential positions between the ends of adjacent magnets. The manner in which the intensity of the magnetic field of the rotor varies as a function of circumferential position may impact various performance characteristics of the electric machine, including the magnitude of eddy current losses and torque ripple experienced by the machine. Unfortunately, with a single step change in magnetic field intensity at the end of each magnetic pole, a permanent-magnet-type rotor that employs a single permanent magnet for each magnetic pole may significantly limit the ability to tailor the distribution of magnetic flux intensity around the circumference of the rotor.

Published U.S. Patent Application No. 2007/0145850 A1 to Hsu ("the '850 application") discloses an electric machine having a rotor with multiple permanent magnets at each magnetic pole of the rotor. The rotor disclosed by the '850 application includes a rotor body formed by a plurality of laminations of ferromagnetic material clamped together on a hub. At each magnetic pole of the rotor, pole pieces secure a plurality of permanent magnets to this rotor body.

Although the '850 application discloses an electric machine with a rotor having multiple permanent magnets at each of its magnetic poles, certain disadvantages persist. For example, the '850 application includes no disclosure regarding how to tailor the relative positions of the permanent magnets to reduce eddy current losses or torque ripple.

The electric machine of the present disclosure solves one or more of the problems set forth above.

SUMMARY OF THE INVENTION

One disclosed embodiment relates to an electric machine. The electric machine may include a rotor having at least one pole pair, the at least one pole pair including a first magnetic pole and a second magnetic pole having opposite polarities. The first magnetic pole may include a first inner radial permanent-magnet layer and a first outer radial permanent-magnet layer. The second magnetic pole may include a second inner radial permanent-magnet layer and a second outer radial permanent-magnet layer. An outer end of the first inner radial permanent-magnet layer and an outer end of the second inner radial permanent-magnet layer may be separated by an angle of between about 27 and about 55 electrical degrees. The electric machine may also include a stator having a stator core with an odd number of stator slots per pole pair of the rotor.

Another embodiment relates to a method of operating an electric machine. The method may include generating magnetic flux with at least one pole pair of a rotor of the electric machine. The at least one pole pair may include a first magnetic pole and a second magnetic pole having opposite polarities. The first magnetic pole may include a first inner radial permanent-magnet layer and a first outer radial permanent-magnet layer. A first portion of the first inner radial permanent-magnet layer and a first portion of the first outer radial permanent-magnet layer may diverge from one another as they extend into the rotor. The method may also include generating magnetic flux with a stator of the electric machine. The stator of the electric machine may include a stator core with an odd number of stator slots per pole pair of the rotor.

A further disclosed embodiment relates to an electric machine. The electric machine may include a rotor with at least one pole pair, the at least one pole pair including a first magnetic pole and a second magnetic pole having opposite polarities. The first magnetic pole may include a first inner radial permanent-magnet layer and a first outer radial permanent-magnet layer. An outer end of the first outer radial permanent-magnet layer and an adjacent outer end of the first inner radial permanent-magnet layer may be separated by an angle of between about 27 and about 55 electrical degrees. The electric machine may also include a stator with a stator core that has an odd number of stator slots per pole pair of the rotor.

DETAILED DESCRIPTION

Figure 1:
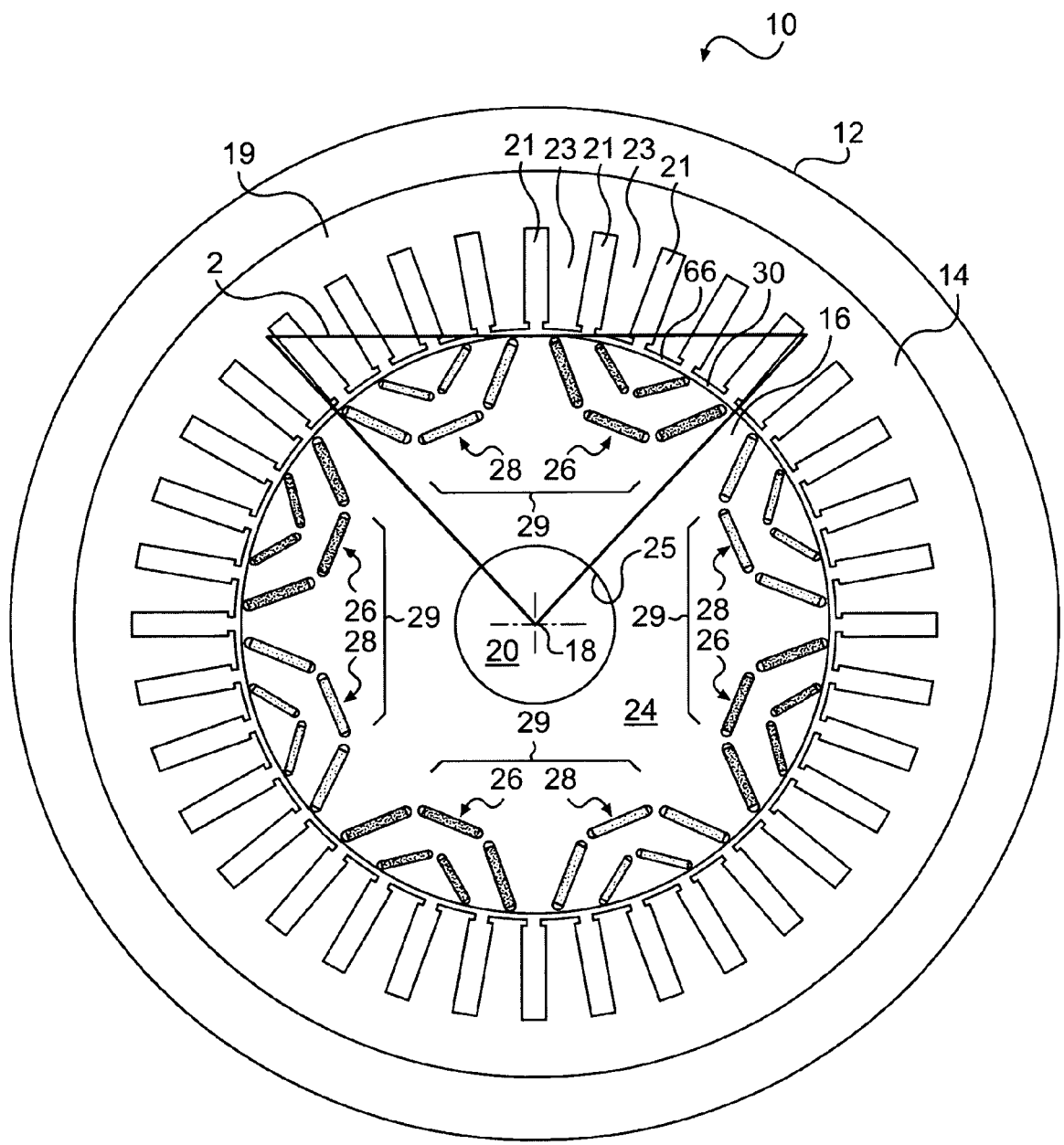
FIG. 1 is a sectional illustration of one embodiment of an electric machine according to the present invention.

FIG. 1 illustrates one embodiment of an electric machine 10 according to the present disclosure. Electric machine 10 may be configured to operate as an electric motor and/or an electric generator. Electric machine 10 may include a housing 12, a stator 14, and a rotor 16.

Housing 12 may provide support for stator 14 and rotor 16. Rotor 16 may be supported by housing 12 in such a manner that rotor 16 may rotate about a rotor rotation axis 18. Housing 12 may support stator 14 in a stationary position adjacent rotor 16. As FIG. 1 shows, in some embodiments, stator 14 may extend around rotor rotation axis 18 and rotor 16, with an annular air gap 66 between an outer perimeter 30 of rotor 16 and stator 14.

Rotor 16 may include a rotor shaft 20 and a rotor core 24. Rotor core 24 may be constructed of a material having a relatively high permeability to magnetic flux, such as a ferrous metal. Rotor core 24 may extend around rotor shaft 20 at a shaft/core interface 25.

Rotor 16 may also include permanent magnets mounted to rotor core 24, and some or all of these permanent magnets may be arranged in permanent-magnet clusters 26, 28. Permanent-magnet clusters 26 and permanent-magnet clusters 28 may be arranged in alternating positions around outer perimeter 30 of rotor 16. For example, rotor 16 may include four permanent-magnet clusters 26 and four permanent-magnet clusters 28 in alternating positions around outer perimeter 30 of rotor 16. As will be described in greater detail below, permanent-magnet clusters 26 may create north magnetic poles of rotor 16, and permanent-magnet clusters 28 may create south magnetic poles of rotor 16. Thus, the magnetic poles formed by permanent-magnet clusters 26 and the magnetic poles formed by permanent-magnet clusters 28 have opposite polarities. Collectively, the north and south magnetic poles created by each adjacent pair of permanent-magnet clusters 26, 28 may constitute a pole pair 29 of rotor 16. Rotor 16 may have various numbers of pole pairs 29. For example, as FIG. 1 shows, rotor 16 may include four pole pairs 29.

Figure 2:
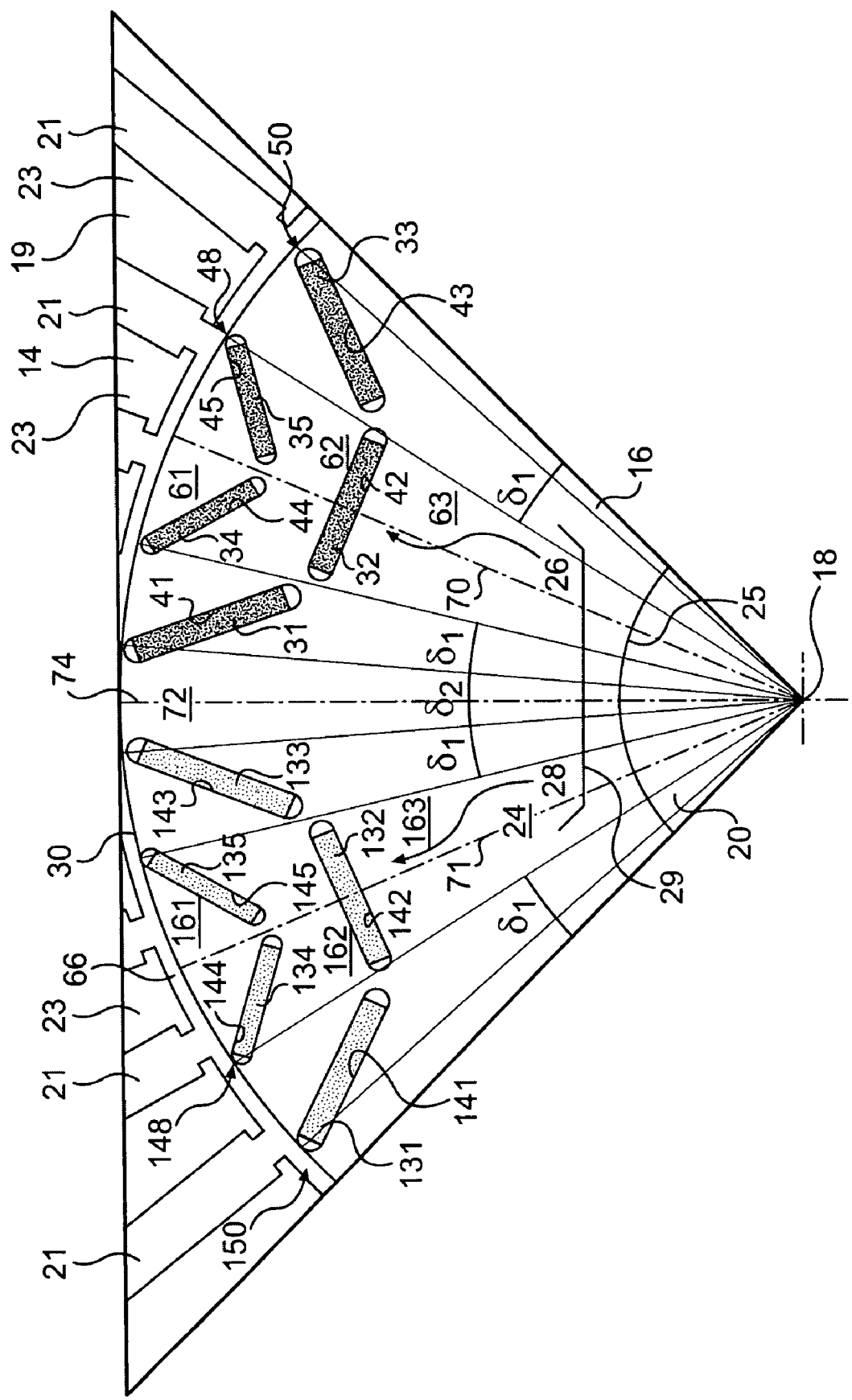
FIG. 2 is an enlarged view of the portion of FIG. 1 shown in triangle 2 of FIG. 1.

FIG. 2 shows a pair of permanent-magnet clusters 26, 28 in greater detail. Permanent-magnet cluster 26 may include permanent magnets 31-35, each of which may be disposed in one of cavities 41-45 in rotor core 24. Permanent-magnet cluster 28 may include permanent magnets 131-135 disposed in cavities 141-145. Each of permanent magnets 31-35 and 131-135 may substantially fill the cavity 41-45, 141-145 housing it except for vacant end portions of the cavities 41-45, 141-145.

Permanent magnets 31-35 in cavities 41-45 and permanent magnets 131-135 in cavities 141-145 may form multiple permanent-magnet layers 48, 50 and 148, 150 of permanent-magnet cluster 26 and permanent-magnet cluster 28, respectively. As used herein, the term "permanent-magnet layer" refers to multiple permanent magnets arranged in cavities that are disposed generally end-to-end or a single permanent magnet that is not arranged end-to-end with other permanent magnets. An inner radial permanent-magnet layer 50 of permanent-magnet cluster 26 may include permanent magnets 31-33 disposed in cavities 41-43. The ends of cavity 42 housing permanent magnet 32 may be disposed adjacent inner ends of cavities 41, 43 housing permanent magnets 31, 33, respectively. From their inner ends adjacent cavity 42, cavities 41, 43 may extend away from one another as they extend to their outer ends disposed adjacent portions of outer perimeter 30 of rotor 16. An inner radial permanent-magnet layer 150 of permanent-magnet cluster 28 may include permanent magnets 131-133 and cavities 141-143 arranged similar to permanent magnets 31-33 and cavities 41-43.

Permanent magnets 34, 35 and cavities 44, 45 may form an outer radial permanent-magnet layer 48 of permanent-magnet cluster 26. Cavities 44, 45 may have their inner ends disposed adjacent one another. From their inner ends, cavities 44, 45 and permanent magnets 34, 35 disposed therein may extend away from one another as they extend outward to points adjacent outer perimeter 30 of rotor 16. Cavity 44 and permanent magnet 34 may extend at an angle relative to cavity 41 and permanent magnet 31. Similarly, cavity 45 and permanent magnet 35 may extend at an angle relative to cavity 43 and permanent magnet 33. Specifically, cavity 44 and permanent magnet 34 may diverge from cavity 41 and permanent magnet 31 as they extend inward from outer perimeter 30 of rotor 16, while cavity 45 and permanent magnet 35 may similarly diverge from cavity 43 and permanent magnet 33 as they extend inward from outer perimeter 30 of rotor 16. Thus, a portion 62 of rotor core 24 between outer radial permanent-magnet layer 48 and inner radial permanent-magnet layer 50 may increase in width as it extends from its end portions adjacent outer perimeter 30 of rotor 16 into permanent-magnet cluster 26.

Permanent magnets 134, 135 and cavities 144, 145 may form an outer radial permanent-magnet layer 148 of permanent-magnet cluster 28. Outer radial permanent-magnet layer 148 may have substantially the same geometric arrangement with respect to other portions of permanent-magnet cluster 28 as outer radial permanent-magnet layer 48 has with respect to other portions of permanent-magnet cluster 26. However, permanent magnets 134, 135 of outer radial permanent-magnet layer 148 may have their south magnetic poles, rather than their north magnetic poles, facing generally radially outwardly.

As mentioned above, permanent-magnet cluster 26 may create a north magnetic pole of rotor 16. Permanent magnets 31-35 may have their north magnetic poles generally facing outer perimeter 30 of rotor 16. Additionally, each permanent-magnet layer 48, 50 may form a flux barrier inside of rotor core 24, such that portions 61, 62 of rotor core 24 located inside permanent-magnet cluster 26 may be magnetically isolated from other portions of rotor core 24 by permanent-magnet layers 48, 50. Because permanent magnets 31-33 have a low permeability to magnetic flux, permanent magnets 31-33 greatly impede magnetic flux from flowing across them to enter or exit portion 62 of rotor core 24. The vacant end portions of cavities 41-43 similarly impede magnetic flux from flowing across inner radial permanent-magnet layer 50 to enter or exit portion 62 of rotor core 24 inside permanent-magnet cluster 26. Additionally, the portions of rotor core 24 adjacent the ends of cavities 41-43 may be sufficiently narrow that they are highly saturated with magnetic flux from permanent magnets 31-33. When highly saturated with magnetic flux, these portions of rotor core 24 also have a low permeability to magnetic flux and, therefore, greatly impede magnetic flux from flowing through them to enter or exit portion 62 of rotor core 24. As a result, very little of the magnetic flux generated by the north magnetic poles of permanent magnets 31-33 may flow through the portions of rotor core 24 adjacent the ends of magnets 31-33 or any other section of the inner radial permanent-magnet layer 50. So, nearly all of the magnetic flux generated by the north magnetic poles of permanent magnets 31-33 may be forced to leave permanent-magnet cluster 26 by flowing substantially radially across annular air gap 66 into stator 14.

Outer radial permanent-magnet layer 48 of permanent-magnet cluster 26 may similarly form a flux barrier that substantially magnetically isolates portion 61 of rotor core 24 from portion 62 of rotor core 24 and portions of rotor core 24 disposed outside permanent-magnet cluster 26. Thus, outer radial permanent-magnet layer 48 may force nearly all of the magnetic flux from the north magnetic poles of permanent magnets 34, 35 to flow substantially radially across annular air gap 66 into stator 14.

As noted above, permanent-magnet cluster 28 may create a south magnetic pole of rotor 16. Permanent-magnet cluster 28 may be configured in a manner similar to permanent-magnet cluster 26, except permanent magnets 131-135 may have their south magnetic poles, rather than their north magnetic poles, directed generally radially outward. Additionally, like inner radial permanent-magnet layer 50 and outer radial permanent-magnet layer 48 of permanent-magnet cluster 26, inner radial permanent-magnet layer 150 and outer radial permanent-magnet layer 148 of permanent-magnet cluster 28 may form flux barriers magnetically isolating portions 161, 162 of rotor core 24 located inside permanent-magnet cluster 28 from other portions of rotor core 24.

In addition to creating north and south magnetic poles of rotor 16, permanent-magnet clusters 26, 28 may define the location of "d" axes 70, 71 of rotor 16, which are radial axes along which rotor 16 has its highest reluctance. Permanent magnets 31-35 and 131 - 135 may greatly impede magnetic flux created by other sources, such as stator 14, from flowing radially between outer perimeter 30 of rotor 16 and inner regions 63 and 163 in portions of rotor core 24 occupied by permanent-magnet clusters 26, 28. On the other hand, a portion 72 of rotor core 24 located between permanent-magnet clusters 26 and 28 may provide a path through which magnetic flux may more readily flow in radial directions. As a result, "d" axes 70, 71 of rotor 16 may extend through the centers of permanent-magnet clusters 26, 28, and a "q" axis 74 of rotor 16, which is a radial axis along which rotor 16 has its lowest reluctance, may extend through portion 72 of rotor core 24.

The concentration of the magnetic field of rotor 16 may vary as a function of the circumferential position around rotor 16. Between the outer ends of outer radial permanent-magnet layer 48, permanent-magnet cluster 26 has its highest magnetic-flux density due to flux production by both the outer radial permanent-magnet layer 48 and inner radial permanent-magnet layer 50. Between each outer end of outer radial permanent-magnet layer 48 and the adjacent outer end of inner radial permanent-magnet layer 50, rotor 16 has a lower density of magnetic-flux production because only inner radial permanent-magnet layer 50 contributes magnetic flux in these regions. Thus, starting from the center of permanent-magnet cluster 26, the intensity of the magnetic flux drops once at the end of outer radial permanent-magnet layer 48 and again at the outer end of inner radial permanent-magnet layer 50. The magnetic-flux density distribution across permanent-magnet cluster 28 varies similarly. Between the adjacent outer ends of inner radial permanent-magnet layer 50 of permanent-magnet cluster 26 and inner radial permanent-magnet layer 150 of permanent magnet cluster 28, the magnetic field of rotor 16 has very low intensity attributable to permanent magnets 31-35, 131-135 because there are no permanent magnets disposed in this region.

Because the intensity of the magnetic field of rotor 16 changes at the outer ends of each outer radial permanent-magnet layer 48, 148 and each inner radial permanent-magnet layer 50, 150, the positions of these features on rotor 16 are significant. In particular, the angle $\delta_1$ separating the outer end of each outer radial permanent-magnet layer 48, 148 and the adjacent outer end of each inner radial permanent-magnet layer 50, 150, as well as the angle $\delta_2$ separating the adjacent outer ends of inner radial permanent-magnet layers 50, 150 have a substantial impact on the performance of electric machine 10, as discussed in greater detail below. Within this disclosure, the magnitude of angles $\delta_1$, $\delta_2$ will be discussed in terms of electrical degrees of rotor 16. Within this disclosure, the angular pitch between the centers of adjacent pole pairs 29 constitutes 360 electrical degrees of rotor 16. Thus, in the embodiment of rotor 16 shown in FIG. 1, which has four pole pairs, rotor 16 includes 1440 electrical degrees.

The angle $\delta_1$ between each outer end of outer radial permanent-magnet layers 48, 148 and the adjacent outer ends of inner radial permanent-magnet layers 50, 150 may fall between about 27 and about 55 electrical degrees of rotor 16. In some embodiments, the angle $\delta_1$ may fall between about 30 and about 40 electrical degrees of rotor 16. Additionally, in some embodiments, the angle $\delta_2$ between the adjacent outer ends of inner radial permanent-magnet layers 50, 150 may fall within a range of about 27-55 electrical degrees of rotor 16. In some embodiments, the angle $\delta_2$ may fall between about 30 and about 40 electrical degrees of rotor 16.

Referring back to FIG. 1, stator 14 may include a stator core 19. Stator core 19 may be constructed of a magnetically permeable material, such as a ferrous metal. Stator core 19 may include radially extending stator slots 21 between radially extending stator teeth 23. Stator 14 may also include windings of an electrical conductor (not shown), such as wire, disposed within stator slots 21 of stator core 19. Such windings of an electrical conductor may be operable to receive electricity from an electrical power source to produce a rotating magnetic field adjacent rotor 16.

Stator 14 may include various numbers of stator slots 21 and stator teeth 23. In some embodiments, the total number of stator slots 21 and stator teeth 23 may be such that there are an odd number of stator slots 21 and stator teeth 23 for each pole pair 29 of rotor 16. For example, stator 14 may include nine stator slots 21 and stator teeth 23 for each pole pair 29 of rotor 16. Thus, in the embodiment shown in FIG. 1, where rotor 16 has four pole pairs 29, stator 14 may have thirty-six stator slots 21 and stator teeth 23. In combination with such a configuration of stator 14, configuring rotor 16 with the above-discussed values of angles $\delta_1$, $\delta_2$ may provide certain performance benefits discussed in detail below.

Electric machine 10 is not limited to the configurations shown in FIGS. 1 and 2. For example, one or more of outer radial permanent-magnet layers 48, 148 and inner radial permanent-magnet layers 50, 150 may be formed by more or fewer permanent magnets than shown in FIGS. 1 and 2. Additionally, permanent-magnet clusters 26, 28 may have different numbers of permanent-magnet layers than shown. Furthermore, angles $\delta_1$, $\delta_2$ may have different values than shown and discussed above. Moreover, in some embodiments, cavities 44, 45, 144, 145 and the permanent magnets 34, 35, 134, 135 they house may extend substantially parallel to cavities 41, 43, 141, 143 and the permanent magnets 31, 33, 131, 133 therein.

INDUSTRIAL APPLICABILITY

Electric machine 10 may have application in any system requiring conversion of energy between electrical energy and mechanical energy. The operation of an electric machine 10 as an electric motor is described below.

During operation of electric machine 10 as an electric motor, a rotating magnetic field generated by stator 14 may interact with rotor 16 and magnetic flux generated by permanent-magnet clusters 26, 28 of rotor 16 to cause a torque on rotor 16. The higher reluctance along "d" axes 70, 71 than along "q" axis 74 of rotor 16 creates a tendency for rotor 16 to align itself with the rotating magnetic field created by stator 14. This tendency is known as a reluctance torque on rotor 16. Additionally, the magnetic flux generated by the permanent magnets 31-35, 131-135 of permanent-magnet clusters 26, 28 may interact with the rotating magnetic field generated by stator 14 to generate magnet torque on rotor 16. The total torque on rotor 16 equals the sum of the reluctance torque and the magnet torque.

During operation, eddy current losses in stator core 19 can detract from the efficiency of electric machine 10. As rotor 16 rotates, the circumferential variation in the intensity of the magnetic field of rotor 16 causes the intensity of magnetic flux in each portion of stator core 19 to vary with time, which can drive eddy current losses in stator core 19. The magnitude of the eddy current losses in stator core 19 depends on the magnitudes of the different harmonics of the varying magnetic flux from rotor 16 and the configuration of stator core 19. The magnitudes of the different harmonics of the magnetic flux from rotor 16 depend primarily on the configuration and arrangement of permanent magnets 31-35, 131-135 in permanent-magnet clusters 26, 28, including the value of angles $\delta_1, \delta_2$.

Analysis has shown that concentrating the spatial harmonic magnetic flux from rotor 16 into those harmonics having orders equal or close to the number of stator slots 21 per pole pair 29 suppresses eddy current losses in stator core 19 to very low values. For example, in the case of the embodiment shown in FIG. 1 having nine stator slots 21 per pole pair 29, concentrating the spatial harmonic magnetic flux of rotor 16 around the ninth order harmonic tends to suppress eddy current losses in stator core 19 to very low values. It has further been found that configuring permanent-magnet clusters 26, 28 such that angles $\delta_1, \delta_2$ fall between about 27 and about 55 electrical degrees and, more particularly, between about 30 and about 40 electrical degrees, provide this desired result of concentrating the spatial harmonic magnetic flux from rotor 16 around the ninth order harmonics.

Eddy current losses in rotor core 24 can also detract from the efficiency of electric machine 10. Magnetic flux flowing through rotor core 24, such as magnetic flux from stator 14, drive these eddy current losses in rotor core 24. Within any flow path in rotor core 24, the eddy current losses driven by magnetic flux therein vary in proportion to the square of the density of magnetic flux. Additionally, within any given flow path in rotor core 24, the intensity of the magnetic flux varies in inverse proportion to the width of the flow path. For example, within portion 62 of rotor core 24 between inner radial permanent-magnet layer 50 and outer radial permanent-magnet layer 48, the intensity of magnetic flux from stator 14 is higher at points where portion 62 has a smaller width and lower at points where portion 62 has a larger width.

Thus, the eddy current losses driven by magnetic flux from stator 14 flowing through portion 62 of rotor core 24 vary as an inverse function of the square of the width of portion 62 as it extends from adjacent outer perimeter 30 of rotor 16 and back to outer perimeter 30 of rotor 16. So, configuring the interior of portion 62 of rotor core 24 with a relatively large width may provide a substantial decrease in eddy current loses at that point. Angling cavities 41, 44 and 43, 45 relative so that they diverge from one another as they extend into rotor 16 may allow configuring the interior of portion 62 with a relatively large width while still setting angles $\delta_1, \delta_2$ at values designed to suppress eddy current losses in stator core 19.

In addition to eddy current losses, another aspect of the operation of electric machine 10 influenced by interaction between the magnetic fields of stator 14 and rotor 16 is torque ripple. Torque ripple is fluctuation in the magnitude of the total torque on rotor 16 as it rotates about rotor rotation axis 18. Torque ripple results largely from interaction between harmonics of the magnetic flux generated by rotor 16 and harmonics of the magnetic flux generated by stator 14.

It has been found that configuring stator core 19 with an odd number, such as nine, of stator slots 21 and stator teeth 23 per pole pair 29 concentrates much of the harmonic energy of the magnetic flux generated by stator 14 in even order harmonics, specifically those harmonics whose order falls immediately below and immediately above the number of stator slots 21 per pole pair 29. For example, configuring stator 14 with nine stator slots 21 per pole pair 29 concentrates much of the harmonic magnetic energy of the stator in the eighth and tenth order harmonics. By contrast, configuring stator core 19 with an even number, such as ten, of stator slots 21 and stator teeth 23 per pole pair 29 would concentrate the harmonic energy of the magnetic flux from stator 14 largely in the odd order harmonics immediately above and immediately below the number of stator slots 21 per pole pair 29. It has further been found that, whereas odd order harmonics of the magnetic flux from stator 14 contribute substantially to torque ripple of electric machine 10, even order harmonics, such as the eighth and tenth harmonics, of the magnetic flux from stator 14 contribute little to ripple torque of electric machine 10. Thus, configuring stator core 19 with nine stator slots 21 and stator teeth 23 per pole pair 29 may substantially reduce the ripple torque of electric machine 10.

It will be apparent to those skilled in the art that various modifications and variations can be made in the disclosed electric machine 10 without departing from the scope of the disclosure. Other embodiments of the disclosed electric machine 10 will be apparent to those skilled in the art from consideration of the specification and practice of the electric machine 10 disclosed herein. It is intended that the specification and examples be considered as exemplary only, with a true scope of the disclosure being indicated by the following claims and their equivalents.

What is claimed is:

1. An electric machine, comprising:
a rotor having at least one pole pair, the at least one pole pair including a first magnetic pole and a second magnetic pole having opposite polarities, wherein
the first magnetic pole includes a first inner radial permanent-magnet layer and a first outer radial permanent-magnet layer,
the second magnetic pole includes a second inner radial permanent-magnet layer and a second outer radial permanent-magnet layer,
an angle $\delta_2$ measured from a rotation axis of the rotor between an outer end of the first inner radial permanent-magnet layer and an outer end of the second inner radial permanent-magnet layer has a value of between about 27 and about 55 electrical degrees; and
a stator having a stator core with an odd number of stator slots per pole pair of the rotor.

2. The electric machine of claim 1, wherein the angle $\delta_2$ has a value of between about 30 and about 40 electrical degrees.

3. The electric machine of claim 2, wherein the stator core includes nine stator slots per pole pair of the rotor.

4. The electric machine of claim 2, wherein an angle $\delta_1$ measured from a rotation axis of the rotor between the outer end of the first inner radial permanent-magnet layer and an adjacent outer end of the first outer radial permanent-magnet layer has a value of between about 27 and about 55 electrical degrees.

5. The electric machine of claim 1, wherein an angle $\delta_1$ measured from a rotation axis of the rotor between the outer end of the first inner radial permanent-magnet layer and an adjacent outer end of the first outer radial permanent-magnet layer has a value of between about 27 and about 55 electrical degrees.

6. The electric machine of claim 1, wherein the angle $\delta_1$ has a value of between about 30 and about 40 electrical degrees.

7. The electric machine of claim 1, wherein an axis of a first portion of the first inner radial permanent-magnet layer and an axis of a first portion of the first outer radial permanent-magnet layer diverge from one another as they extend into the rotor.

8. A method of operating an electric machine, comprising:
generating magnetic flux with at least one pole pair of a rotor of the electric machine, wherein the at least one pole pair includes a first magnetic pole and a second magnetic pole having opposite polarities, the first magnetic pole includes a first inner radial permanent-magnet layer and a first outer radial permanent-magnet layer, an axis of a first portion of the first inner radial permanent-magnet layer and an axis of a first portion of the first outer radial permanent-magnet layer diverge from one another as they extend into the rotor;

the second magnetic pole includes a second inner radial permanent-magnet layer and a second outer radial permanent-magnet layer;

an angle $\delta_2$ measured from a rotation axis of the rotor between the outer end of the first inner radial permanent-magnet layer and an outer end of the second inner radial permanent-magnet layer has a value of between about 27 and about 55 electrical degrees; and generating magnetic flux with a stator of the electric machine, wherein the stator of the electric machine includes a stator core with an odd number of stator slots per pole pair of the rotor.

9. The method of claim 8, wherein an angle $\delta_1$ measured from a rotation axis of the rotor between the outer end of the first inner radial permanent-magnet layer and an adjacent outer end of the first outer radial permanent-magnet layer has a value of between about 27 and about 55 electrical degrees.

10. The method of claim 9, wherein the stator core includes nine stator slots per pole pair of the rotor.

11. The method of claim 8, wherein an angle $\delta_1$ measured from a rotation axis of the rotor between the outer end of the first inner radial permanent-magnet layer and an adjacent outer end of the first outer radial permanent-magnet layer has a value of between about 27 and about 55 electrical degrees.

12. The method of claim 8, wherein an axis of a second portion of the first outer radial permanent-magnet layer and an axis of a second portion of the first inner radial permanent-magnet layer diverge from one another as they extend into the rotor.

13. An electric machine, comprising:

a rotor with at least one pole pair, the at least one pole pair including a first magnetic pole and a second magnetic pole with opposite polarities, wherein the first magnetic pole includes a first inner radial permanent-magnet layer and a first outer radial permanent-magnet layer, and an angle $\delta_1$ measured from a rotation axis of the rotor between an outer end of the first outer radial permanent-magnet layer and an adjacent outer end of the first inner radial permanent-magnet layer has a value of between about 27 and about 55 electrical degrees;

the second magnetic pole includes a second inner radial permanent-magnet layer and a second outer radial permanent-magnet layer, and an angle $\delta_2$ measured from a rotation axis of the rotor between an outer end of the first inner radial permanent-magnet layer and an outer end of the second inner radial permanent-magnet layer has a value of between about 27 and about 55 electrical degrees; and a stator with a stator core that has an odd number of stator slots per pole pair of the rotor.

14. The electric machine of claim 13, wherein an axis of a first portion of the first inner radial permanent-magnet layer and an axis of a first portion of the first outer radial permanent-magnet layer diverge from one another as they extend into the rotor.

15. The electric machine of claim 14, wherein the stator core includes nine stator slots per pole pair of the rotor.

16. The electric machine of claim 15, wherein the angle $\delta_1$ has a value of between about 30 and about 40 electrical degrees.

17. The electric machine of claim 13, wherein the angle $\delta_1$ has a value of between about 30 and about 40 electrical degrees.

18. The electric machine of claim 13, wherein the stator core includes nine stator slots per pole pair of the rotor.

* * * * *